(12) United States Patent
Goenka et al.

(10) Patent No.: US 11,023,260 B2
(45) Date of Patent: Jun. 1, 2021

(54) SYSTEMS AND METHODS FOR TRANSFORMING OPERATION OF APPLICATIONS

(71) Applicant: Oath Inc., New York, NY (US)

(72) Inventors: Mohit Goenka, Santa Clara, CA (US);
Nikita Varma, Milpitas, CA (US);
Ashish Khushal Dharamshi, Sunnyvale, CA (US)

(73) Assignee: Verizon Media Inc., New York, NY (US)

(*) Notice: Subject to any disclaimer, the term of this patent is extended or adjusted under 35 U.S.C. 154(b) by 0 days.

(21) Appl. No.: 16/115,638

(22) Filed: Aug. 29, 2018

(65) Prior Publication Data
US 2020/0073680 A1    Mar. 5, 2020

(51) Int. Cl.
  *G06F 9/451* (2018.01)
  *G06F 16/9535* (2019.01)
  *H04L 29/08* (2006.01)

(52) U.S. Cl.
  CPC .......... *G06F 9/451* (2018.02); *G06F 16/9535* (2019.01); *H04L 67/22* (2013.01); *H04L 67/2842* (2013.01)

(58) Field of Classification Search
  CPC .... G06F 9/451; G06F 16/9535; G06F 16/432; H04L 67/22; H04L 67/2842; G06Q 10/107; G06Q 10/109; G06Q 50/01; G06Q 10/10
  See application file for complete search history.

(56) References Cited

U.S. PATENT DOCUMENTS

| | | | | |
|---|---|---|---|---|
| 8,185,591 B1* | 5/2012 | Lewis | ..................... | H04L 51/08 709/206 |
| 8,286,085 B1* | 10/2012 | Denise | ................. | G06Q 10/107 715/752 |
| 8,645,825 B1* | 2/2014 | Cornea | ................. | G06F 17/276 715/257 |
| 9,654,598 B1* | 5/2017 | Crawford | ................ | H04L 67/22 |
| 2002/0184321 A1* | 12/2002 | Fishman | .............. | G06Q 10/109 709/206 |
| 2005/0131888 A1* | 6/2005 | Tafoya | ................. | G06Q 10/107 |
| 2005/0132004 A1* | 6/2005 | Horvitz | ................ | G06Q 10/109 709/204 |
| 2011/0010244 A1* | 1/2011 | Hatridge | ................ | G06Q 30/00 705/14.53 |
| 2011/0010669 A1* | 1/2011 | Basu | ...................... | G06Q 10/10 715/825 |
| 2011/0106889 A1* | 5/2011 | Scott | .................... | G06Q 10/107 709/206 |

(Continued)

*Primary Examiner* — Daniel W Parcher
(74) *Attorney, Agent, or Firm* — Cooper Legal Group, LLC

(57) ABSTRACT

One or more computing devices, systems, and/or methods for transforming operation of an application based upon real-time user activity analysis are provided. For example, user interaction with an application is monitored to determine that a user action was performed at a threshold frequency. The user action is evaluated to identify a context of the application when the user action was performed. The user action is evaluated to identify data upon which the user action was performed. In response to determining that a current context of the application matches the context, operation of the application is transformed to include a data item corresponding to the data.

20 Claims, 8 Drawing Sheets

(56) References Cited

U.S. PATENT DOCUMENTS

| | | | |
|---|---|---|---|
| 2011/0238671 A1* | 9/2011 | Walker | G06F 3/00 |
| | | | 707/748 |
| 2011/0314390 A1* | 12/2011 | Park | G06F 9/451 |
| | | | 715/752 |
| 2012/0166532 A1* | 6/2012 | Juan | G06Q 50/01 |
| | | | 709/204 |
| 2014/0004889 A1* | 1/2014 | Davis | H04W 4/12 |
| | | | 455/466 |
| 2015/0348551 A1* | 12/2015 | Gruber | G06F 17/2705 |
| | | | 704/235 |
| 2017/0200129 A1* | 7/2017 | Garg | H04L 51/046 |

* cited by examiner

SYSTEMS AND METHODS FOR TRANSFORMING OPERATION OF APPLICATIONS

BACKGROUND

Many users utilize applications executing on computing devices to perform various tasks. In one example, an email application provides functionality to create new emails, receive emails, read emails, and/or perform other tasks relating to email. In another example, a social network application provides functionality to create posts, view other user's posts, share images, and/or perform other tasks relating to a social network. Such applications provide hardcoded functionality that executes commands directly mapped to input by a user. For example, every time a user interacts with a create post button, the social network application always executes the same code of the create post button to generate and display the same create post user interface for creating a new social network post. Merely providing the same generic hardcoded functionality/commands significantly limits the functionality that an application can provide.

SUMMARY

In accordance with the present disclosure, one or more computing devices and/or methods for transforming operation of an application based upon real-time user activity analysis are provided. In an embodiment, user interaction with an application executing on a computer device is monitored to determine that a user action was performed at a threshold frequency. For example, a user may be sending out birthday party invitation emails to friends. For each birthday party invitation email, the user may insert the same subject line "Birthday Party" and the same image into the birthday party invitation emails. The threshold frequency may be met once the user inserts the same subject line and/or the same image into birthday party invitation emails more than 4 times within 30 minutes. It may be appreciated that any number of occurrences of the user action within any timespan may be defined as the threshold frequency (e.g., 10 times within 2 days, 2 times within 3 days, etc.).

The user action is evaluated to identify a context of the application when the user action was performed. For example, the context corresponds to the user creating a birthday party invitation email through an email creation interface of the application. The application can be associated with any number of contexts, such as a search context of the user searching for emails within a deleted folder, a deletion context of the user deleting emails, etc. The user action is also evaluated to identify data upon which the user action was performed. For example, the data corresponds to the subject line "Birthday Party" and the image inserted in into the birthday party invention emails by the user.

A determination may be made that a current context of the application matches the context under which the user action was performed. The current context and the context may occur during the same instance of the application being executed or during different instances of the application being executed at different times. In one example, the current context may match the context based upon the user accessing the email creation interface of the application to create a new email. Accordingly, operation of the application is transformed to include a data item corresponding to the data. For example, the data item corresponds to text "Birthday Party" that can be inserted into the subject line of the new email. The data item may also correspond to the image that can be inserted into the new email. In one example, the data item is displayed through a selection interface so that the data item will be added to the new email in response to selection of the data item. In another example, the data item is automatically inserted into the new email without the need of user input.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
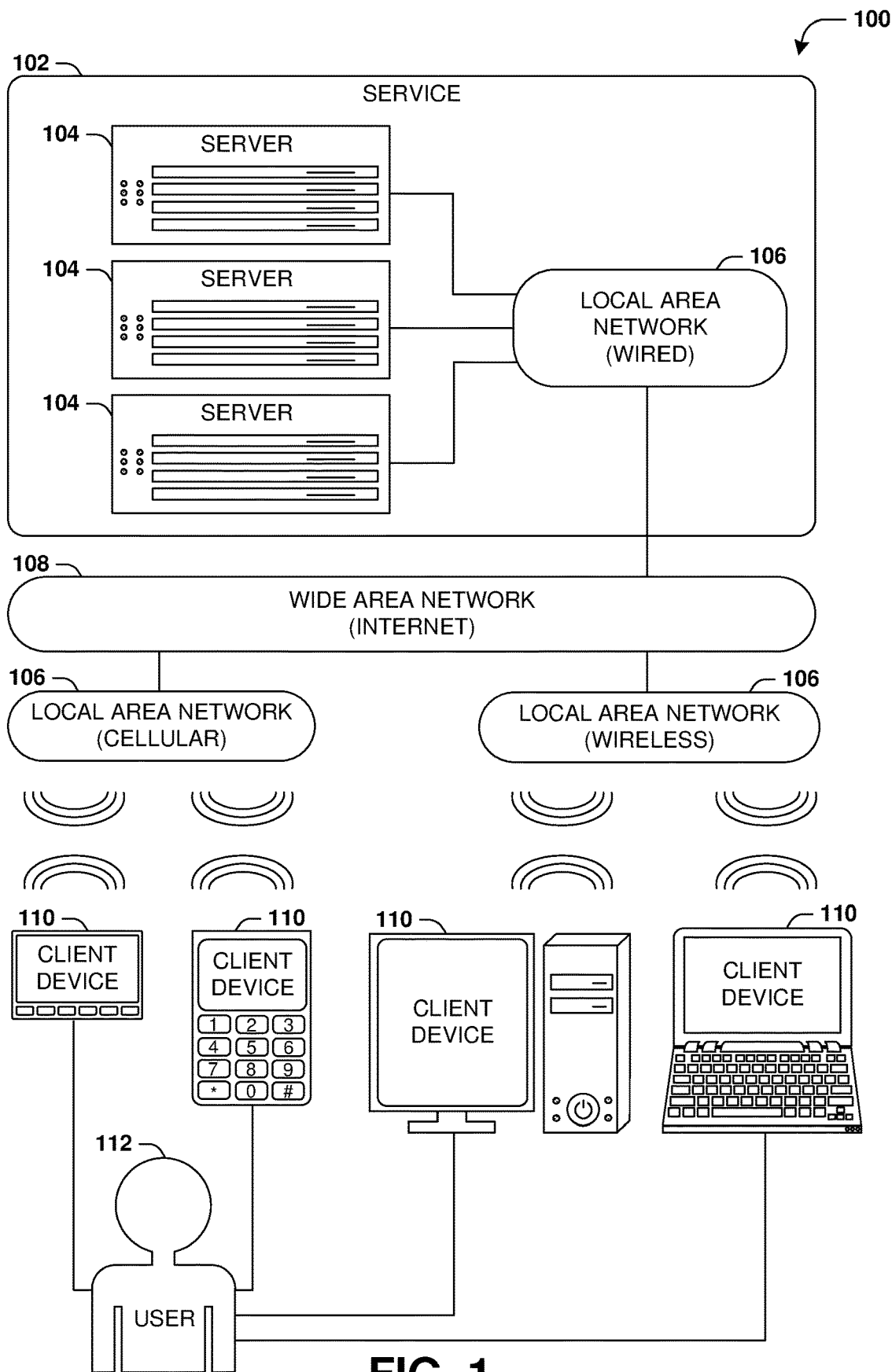
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
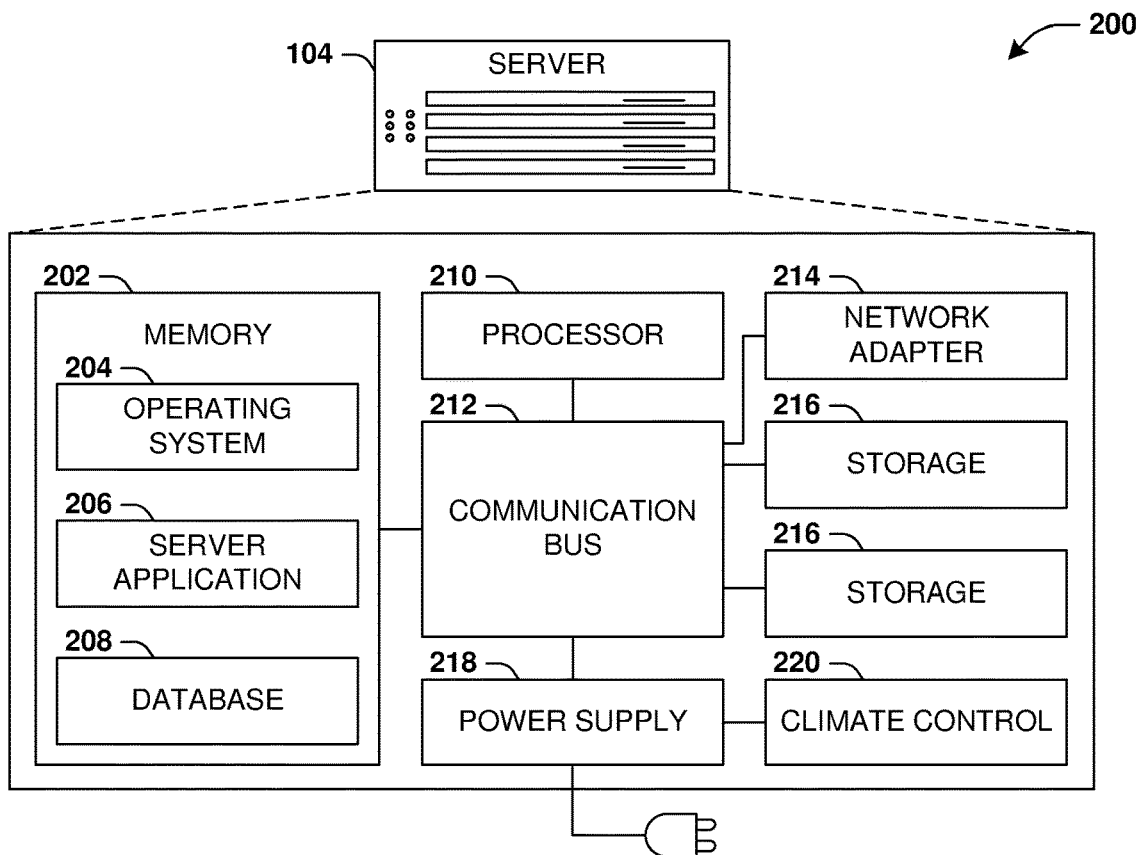
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
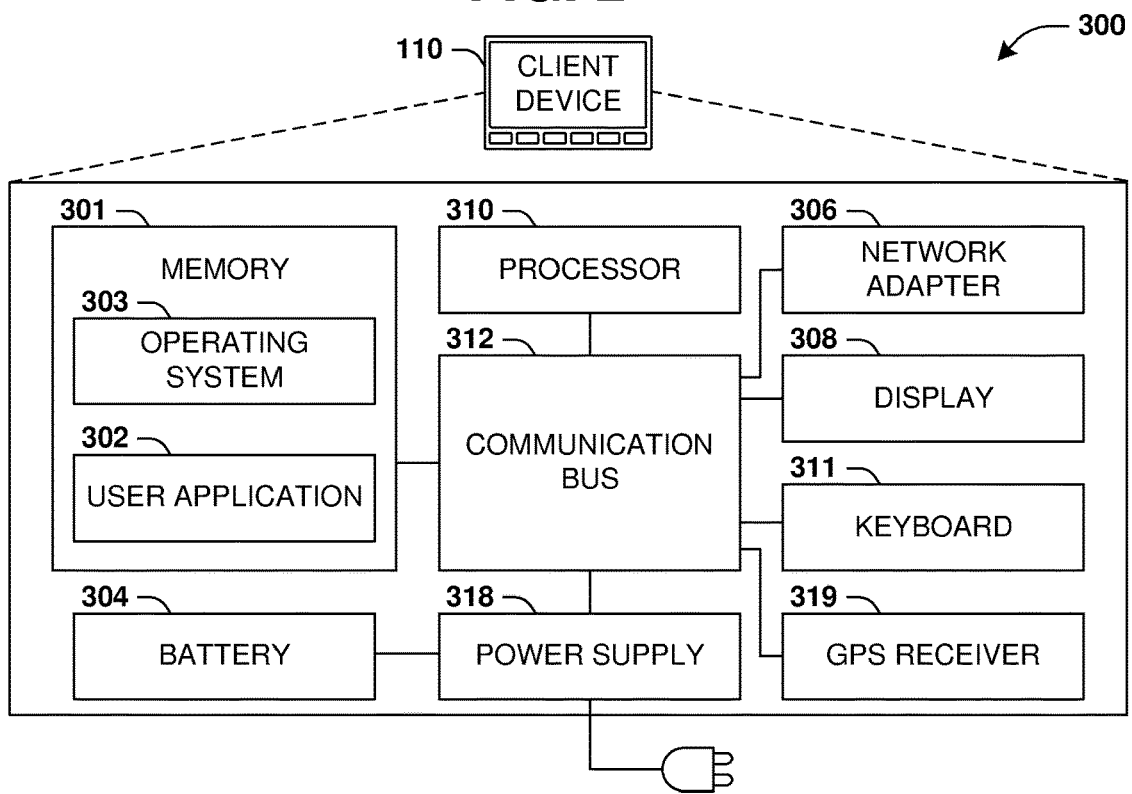
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more systems and/or techniques for transforming operation of an application based upon real-time user activity analysis are provided. This technical process improves existing technological processes for controlling operation of applications by modifying operation of an application based upon real-time user activity analysis. That is, existing applications merely react to user input by executed the same hardcoded commands mapped to the user input. For example, when a user selects a create social network post, the same create social network post user interface with the same blank fields used to create a post may be displayed. Existing applications are unable to provide customized user experiences that are trailed to particular user's interaction habits identified by real-time user activity analysis.

Accordingly, the present system monitors user actions with an application in real-time in order to modify operation of the application based upon real-time user interaction habits. A user's experience with the application will dynamically change based upon the user's interactions (e.g., if the user frequently uses a blue font in emails, then a blue font setting will be automatically set for subsequent email creation, and if the user later frequently uses a red front for emails, then a red font setting will be automatically set for subsequent email creation). For example, if the user frequently sends messages with a particular GIF image, then the present system will modify operation of the application to either automatically insert the GIF image into a next message that the user creates or provide a suggestion of the GIF image to insert into the next message. Different users have different habits so each user's experience with the application will be tailored to each user's habits and will change based upon what user is interacting with the application. For example, a second user may attach a different GIF image or may frequently apply a background color to messages. Thus, operation of the application is modified to automatically insert or suggest the different GIF image and apply or suggest the background color to a next message that the second user is creating.

The present system can analyze user actions in real-time as a user interacts with an application. Thus, the present system can transform/modify the application in real-time as the user interacts with the application so that the application operates in a modified manner tailored to the user actions, as opposed to merely performing standard hardcoded functionality/commands. This improves upon existing technical processes that would otherwise operate an application to perform standard hardcoded functionality/commands. Also, existing technical processes for analyzing user behavior merely perform offline analysis to create recommendations (e.g., recommend a service or search query).

The present system improves the efficiency of users interacting with the application and the computer executing the application. This improvement also improves the operation of the application by providing new functionality not normally provided by the application during normal operation. For example, operation of the application can be transformed such as to display a GIF picker user interface populated in real-time with a GIF image that a user has recently/frequently used. Further, the present system can detect habits over a short time span, and modify the operation of the application on the fly during execution (e.g., detecting the user is sending Christmas emails with the same subject line, and thus subsequent emails may be auto populated with the subject line). Conventional techniques must perform offline analysis of data collected over long periods of time.

Figure 4:
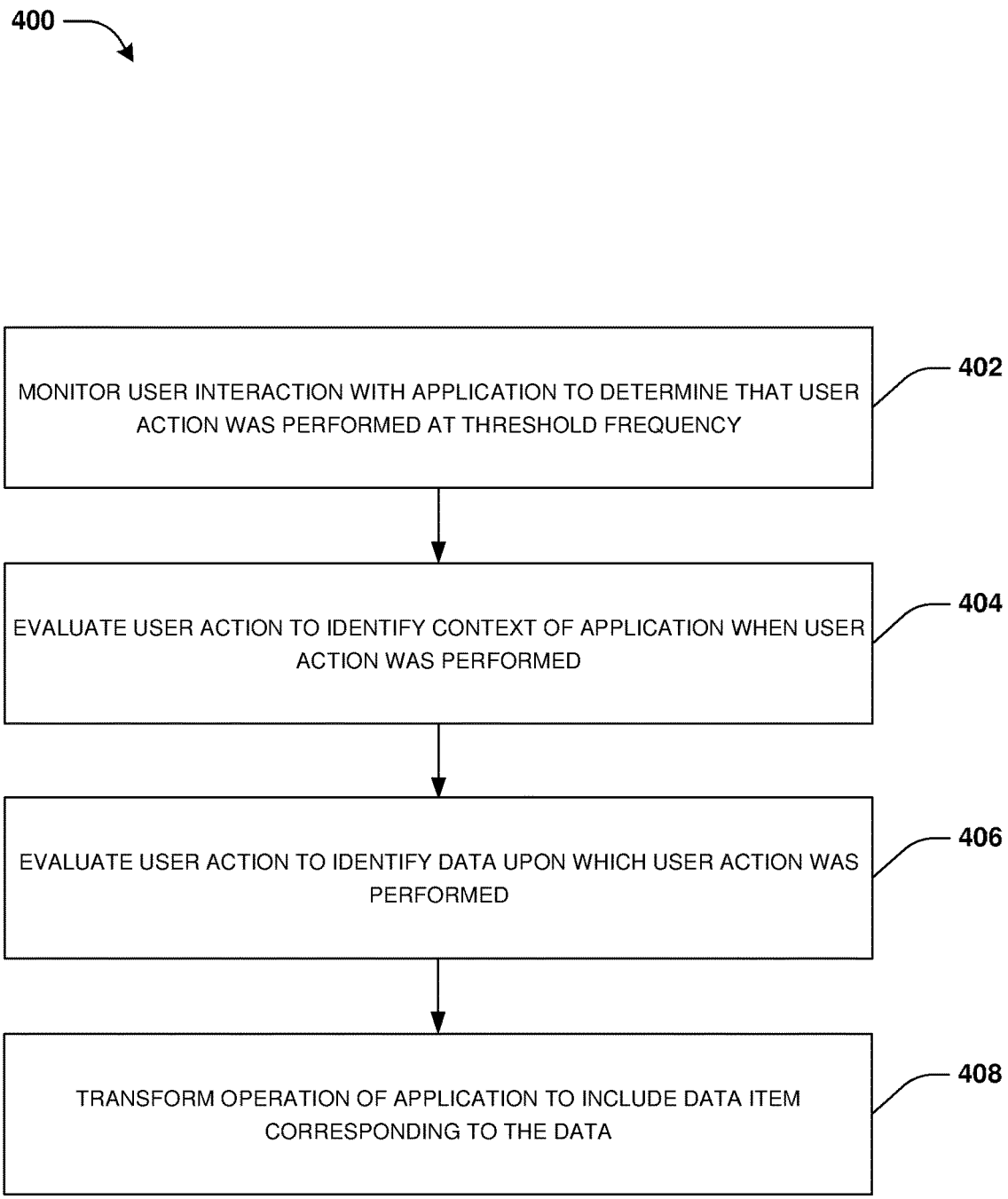
FIG. 4 is a flow chart illustrating an example method for transforming operation of an application based upon real-time user activity analysis.

An embodiment of transforming operation of an application based upon real-time user activity analysis is illustrated by an example method 400 of FIG. 4. The application, such as a calendar application, may be executing on a computing device. The user may be using the calendar application to schedule individual meetings with 50 different employees to discuss a new dress code policy. Each time the user creates a meeting invite through the calendar application, the user inserts the same title and meeting location into each meeting invite. The user must waste significant amounts of time and computer resources to re-input the title and meeting location information for all 50 meeting invites. Even using copy/paste functionality still wastes time and resources.

Accordingly, as provided herein, operation of the application is dynamically modified based upon real-time analysis of the user interaction. At 402, user interaction with the application is monitored to determine that a user action was performed at a threshold frequency. The threshold frequency may correspond to the user action being performed at least a certain number of times within a particular time period. It may be appreciated that any time period and number of times being performed can be designated. For example, the threshold frequency may correspond to a user action being performed at least 4 times within the last 25 minutes. In another example, the threshold frequency may correspond to a user action being performed at least 10 times within the last 2 days.

Different threshold frequencies can be defined for different types of user actions, such as a first threshold frequency of 3 times within the last 10 minutes is set for a create meeting invite action while a second threshold frequency of 2 times within the last 12 hours is set for a delete calendar entry action. In one example, the threshold frequency may specify that the same user action must be performed without any intervening differences (e.g., the exact same title is inserted into new meeting invites). In another example, the threshold frequency may allow for a certain number of differences between the same user action being performed. For example, the threshold frequency may specify that if 15 out of the last 17 new meeting invite have the same title, then the threshold frequency is met.

At 404, the user action is evaluated to identify a context of the application when the user action was performed. For example, a create meeting invite with a title "meeting to discuss new dress code" may be identified as the context. That is, the context corresponds to the user creating the meeting invite to schedule a meeting to discuss the new dress code. The context may correspond to a current instance of the calendar application executing on the computing device.

At 406, the user action is evaluated to identify data upon which the user action was performed. For example, the data may correspond to text of the title "meeting to discuss new dress code" and/or text of the meeting location that the user inserted into the meeting invite. If a first user action of creating a meeting invite with the title "meeting to discuss new dress code" and a second user action of creating a subsequent meeting invite with a different a title "lunch meeting" are performed, then these two actions are not considered the same user action even though they both are creating a meeting invite. This is because different meeting invites are being created that are not similar, and thus do not count towards two instances of a same user action being performed.

The tracking of user actions may be performed using a data structure, such as a graph or chart. For example, user interactions with the calendar application are monitored to identify a set of users actions performed through the application. The set of user actions may comprise a first create meeting invite action for a dress code meeting, a second create meeting invite action for having a lunch meeting, a delete calendar entry action to delete a calendar entry about mowing the lawn, a search action to search deleted calendar entries for calendar entries matching a query "gym", a change calendar theme action to change an application theme to a fall theme, and/or a wide variety of other actions that can be performed through the calendar application. Categories of the user actions are determined, such as a delete mow lawn calendar entry, a create lunch meeting invite, a search deleted calendar entries using a keyword "gym", etc.

The data structure is populated with the categories and counts of how frequently the corresponding user actions of each category are performed. For example, when the user creates another lunch meeting invite, a count for the create lunch meeting invite category is incremented. Other information such as timestamps of when user actions were performed or when a most recent user action was performed may be maintained within the data structure. In this way, the data structure can be evaluated to see if a user action exceeds the threshold frequency by comparing the count data and/or timestamp data to the threshold frequency. As new actions are performed, the data structure is dynamically updated to reflect such. Stale entries of user actions that have not been performed for a threshold amount of time may be removed from the data structure.

A determination is made that a current context of the calendar application matches the context under which the user action was previously performed. For example, the current context may correspond to the user interaction with a create meeting invite button in order to create a new meeting invite. The current context may be determined as corresponding to the context of the user action where the user created the meeting invite with the title "meeting to discuss new dress code" and the meeting location. The current context and context may correspond to the user interacting with the create meeting invite button and/or a create meeting invite user interface that is displayed in response to the create meeting invite button being clicked. In one example, the current context and the context both occur during a same instance of the calendar application being executed. In another example, the current context occurs during a different/subsequent instance of the calendar application being executed than when the context occurred.

At 408, operation of the application is transformed to include a data item corresponding to the data. For example, the data item comprises text "meeting to discuss new dress code" that can be inserted into a title of the new meeting invite currently being created by the user under the current context. The data item can comprise text of the meeting location. In this way, a data item may comprise text, an image, a video, or other content that the user has routinely created or used when performing the user action in the past. Data items may corresponds to a variety of data. For example, a data item may comprise a setting that can be applied to the application, such as visual setting (e.g., a color and background theme for the application), a color setting (e.g., a font color and style), a display setting (e.g., what columns of data are displayed within an inbox of an email application), an options setting (e.g., set an automatic out of office reply message, a work hours setting, a reminder setting, a permissions setting, a time zone setting, a weather display setting, etc.), and/or a variety of other settings of applications.

In one example, the data item is automatically apply to the application. For example, the user may change a theme of the calendar application every change of season. As a next season change is about to happen (e.g., a current context being the change of a season), a new theme for that season can be automatically applied to the calendar application.

In another example, the data item may be automatically inserted into content of the application, such as a document, message, or calendar entry being accessed and/or composed through the application. For example, the data item of the title "meeting to discuss new dress code" and the meeting location can be automatically inserted into the new meeting invite being created by the user through the calendar application.

In another example, a user interface is rendered and populated with the data item for selection. In response to the user selecting the data item of the title "meeting to discuss new dress code", the text is inserted into the title of the new meeting invite. In response to the user selecting the meeting location, the text is inserted into a meeting location field of the new meeting invite.

In another example, a set of data items corresponding to a set of data upon which user actions were performed at the threshold frequency is determined. For example, a top 4 (or any other number) mostly frequently used meeting invite titles by the user when creating new meeting invites are identified as the set of data items. The set of data items are populated into the user interface for selection.

In an embodiment, a set of user actions that are performed at the threshold frequency are dynamically identified as the user interacts with the application. A recommendation may be provided to the user of the set of user actions through the application. In this way, the user can quickly and efficiently execution user actions, through a recommendation user interface, that the user routinely performs. As the user continues to interact with the application, the set of user actions are dynamically updated, such as to remove a user action that the user now less frequently performs so that a more frequently performed user action can replace the less frequently performed user action within the recommendation user interface.

In an embodiment, when a user performs a user action, a second user action that has a probability above a threshold of being subsequently performed is identified. The second user action may be an action that is bound to happen or a natural next step for the user to take next. In one example, a recommendation to perform the second action may be provided in response to the user action being executed. In another example, the second action is automatically executed in response to the user action being performed. For example, the user always sets an out of office reply setting when the user travels and/or sends out of office emails to users within the user's contact list. Upon booking an air flight for later that day, a recommendation to set the out of office reply setting and/or send the out of office emails may be provided to the user or automatically performed.

In an embodiment, the user action corresponds to the user performing a search for content (e.g., a search for deleted calendar entries within a trash folder that have the term "work meeting") accessible through the application. The data of the user action corresponds to keywords used in the search, such as "work meeting". When the user executes the application through the computing device, a new search using the keywords may be automatically triggered and performed to identify search results for "work meeting". The search results are populated within a user interface that is displayed through the application. The user interface is dynamically updated as new search results become available. For example, when a calendar entry having a title "planning meeting for work meeting" is deleted, the deleted calendar entry may be identified by an updated search and inserted into the user interface as updated search results.

In an embodiment, the data item corresponds to data remotely accessible from a remote service. For example, the user routinely inserts an image from an image service into new meeting invites. When the current context of creating a new meeting invite corresponds to the context of the user previously creating the new meeting invites with the image, the image is retrieved from the image service as the data item. For example, the computing device retrieves the image over a network from a remote server hosting the image service. The data item, such as the image, is stored into a cache of the computing device for local access by the application to the data item. This reduces server load and bandwidth because the remote service is not accessed over the network by the computing device in order to retrieve the image every time a new meeting invite is created.

Figure 5:
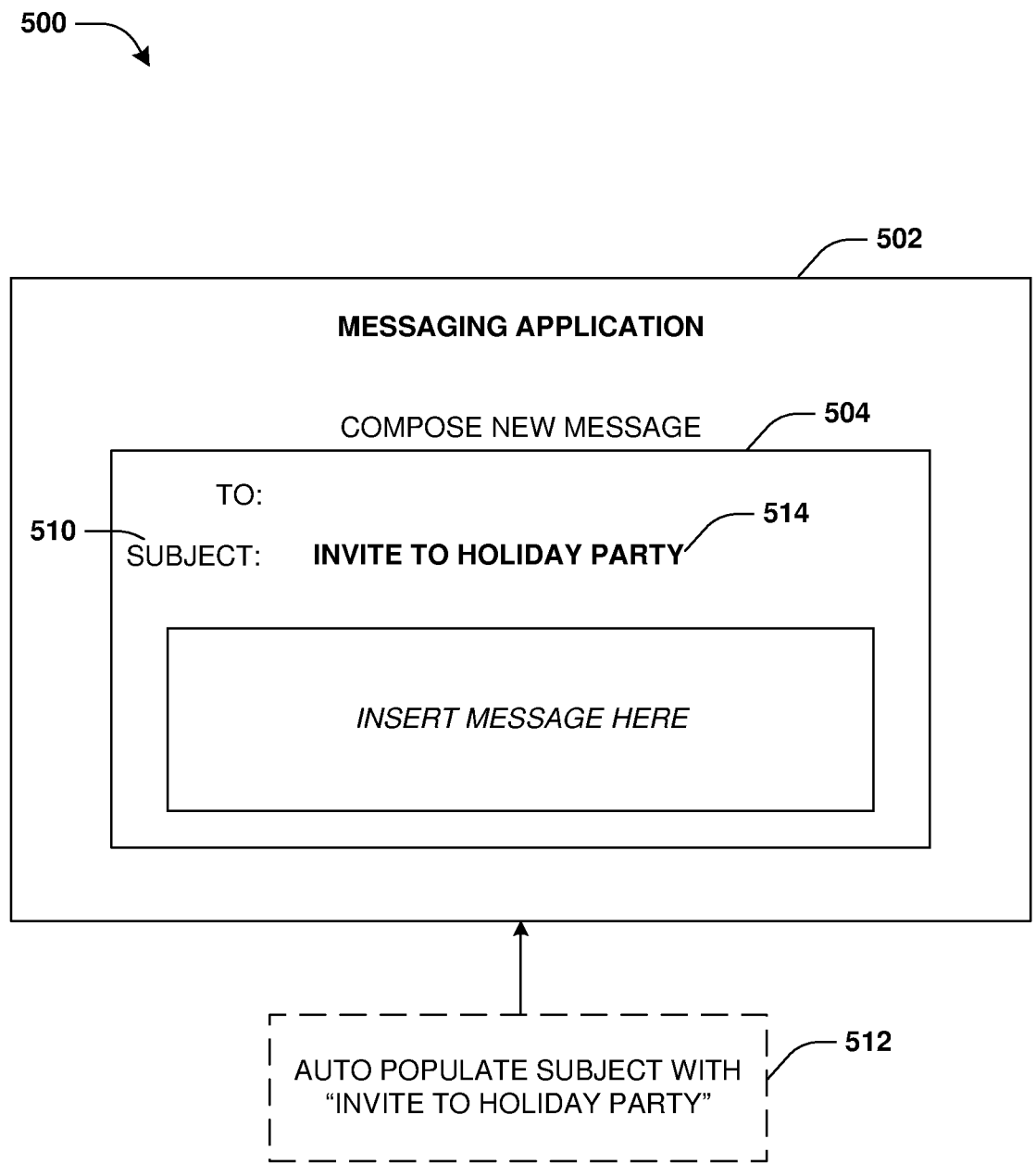
FIG. 5 is a component block diagram illustrating an example system for transforming operation of an application based upon real-time user activity analysis, where text is auto populated into a subject line.

FIG. 5 illustrates an example of a system 500 for transforming operation of an application based upon real-time user activity analysis. A user may routinely use a messaging application 502 to send invite emails for an upcoming holiday party. The user may plan to send 200 invite emails at a frequency of 10 emails per day. When the user creates an invite email, the user almost always uses the subject "invite to holiday party" 514 in a subject field 510. The user action of creating an invite email with the subject "invite to holiday party" 514 may be determined as occurring at a threshold frequency. For example, the threshold frequency may correspond to performing user actions more than 7 times within 30 hours. The context of the user action corresponds to creating an invite email, and data of the user action corresponds to the subject "invite to holiday party" 514.

The user may be composing an $8^{th}$ invite email within the last 30 hours through a compose new message interface 504. Accordingly, a current context of the messaging application 502 is determined as corresponding to the context of the user action of previously creating the last 7 invite emails. Operation of the message application 502 is transformed 512 to automatically populate the subject field 510 of the $8^{th}$ invite email with the subject "invite to holiday party" 514. In this way, behavior of the messaging application 502 is modified/transformed based upon real-time user activity analysis.

Figure 6:
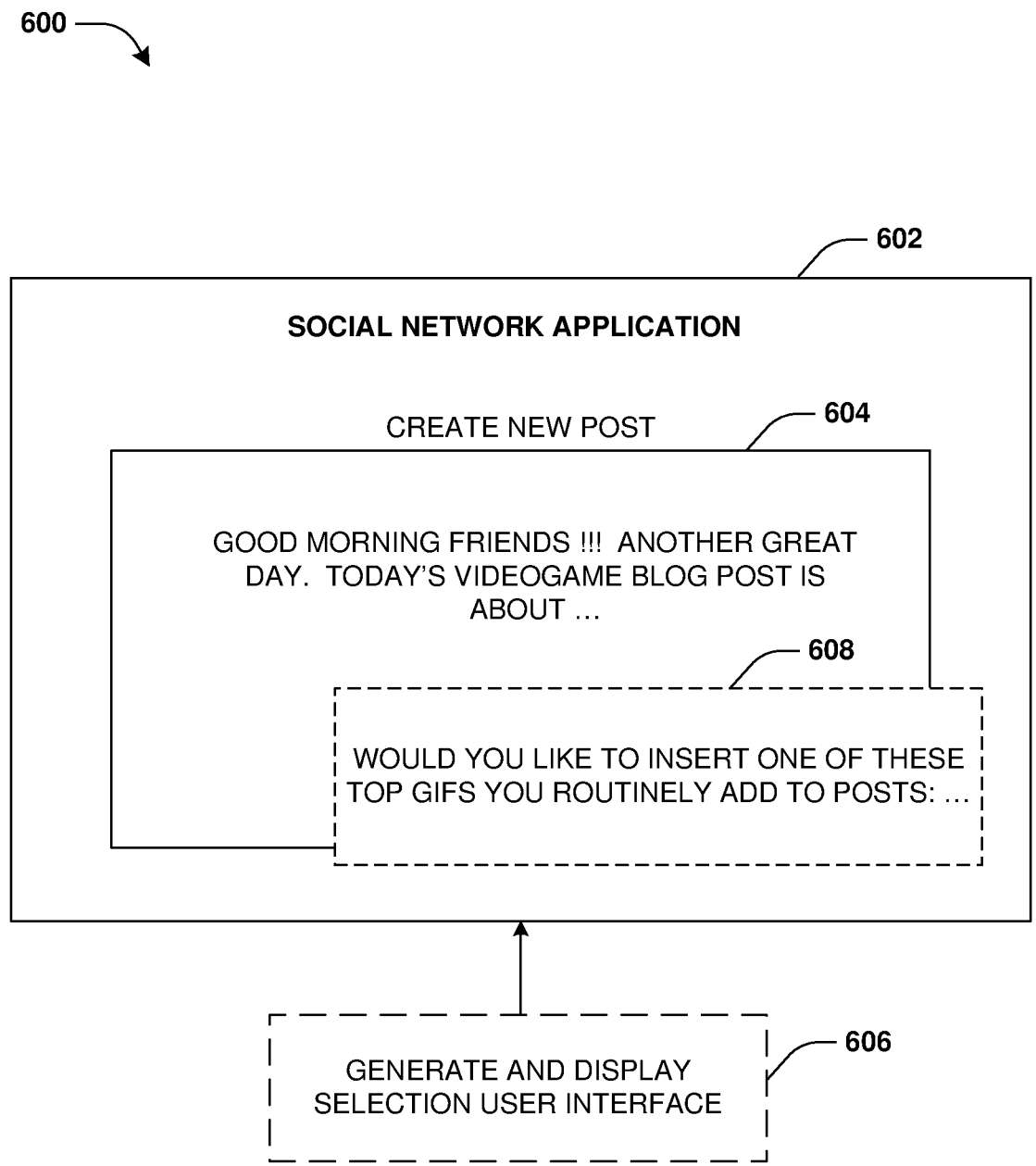
FIG. 6 is a component block diagram illustrating an example system for transforming operation of an application based upon real-time user activity analysis, where a user selection user interface is displayed.

FIG. 6 illustrates an example of a system 600 for transforming operation of an application based upon real-time user activity analysis. A user may routinely use a create new post user interface 604 of a social network application 602 to create social network videogame posts having a videogame GIF attached to the posts (e.g., the user is a videogame blogger). The user action of creating a social network videogame post with the videogame GIF may occur at a frequency of 10 times per week. The user action may be determined as occurring at a threshold frequency. For example, the threshold frequency may correspond to performing user actions more than 3 times per week. The context of the user action corresponds to creating a social network videogame post, and data of the user action corresponds to the videogame GIF.

The user may be composing an a $4^{th}$ post within the last week through the create new post user interface 604. Accordingly, a current context of the social network application is determined as corresponding to the context of the user action of previously creating the social network videogame posts. Operation of the social network application 602 is transformed 606 by rendering a user interface 608 populated with the GIF and/or other frequently used GIFs by the user. In this way, the user can select a GIF through the user interface 608 to quickly and efficiently insert the GIF into the $4^{th}$ post.

Figure 7A:
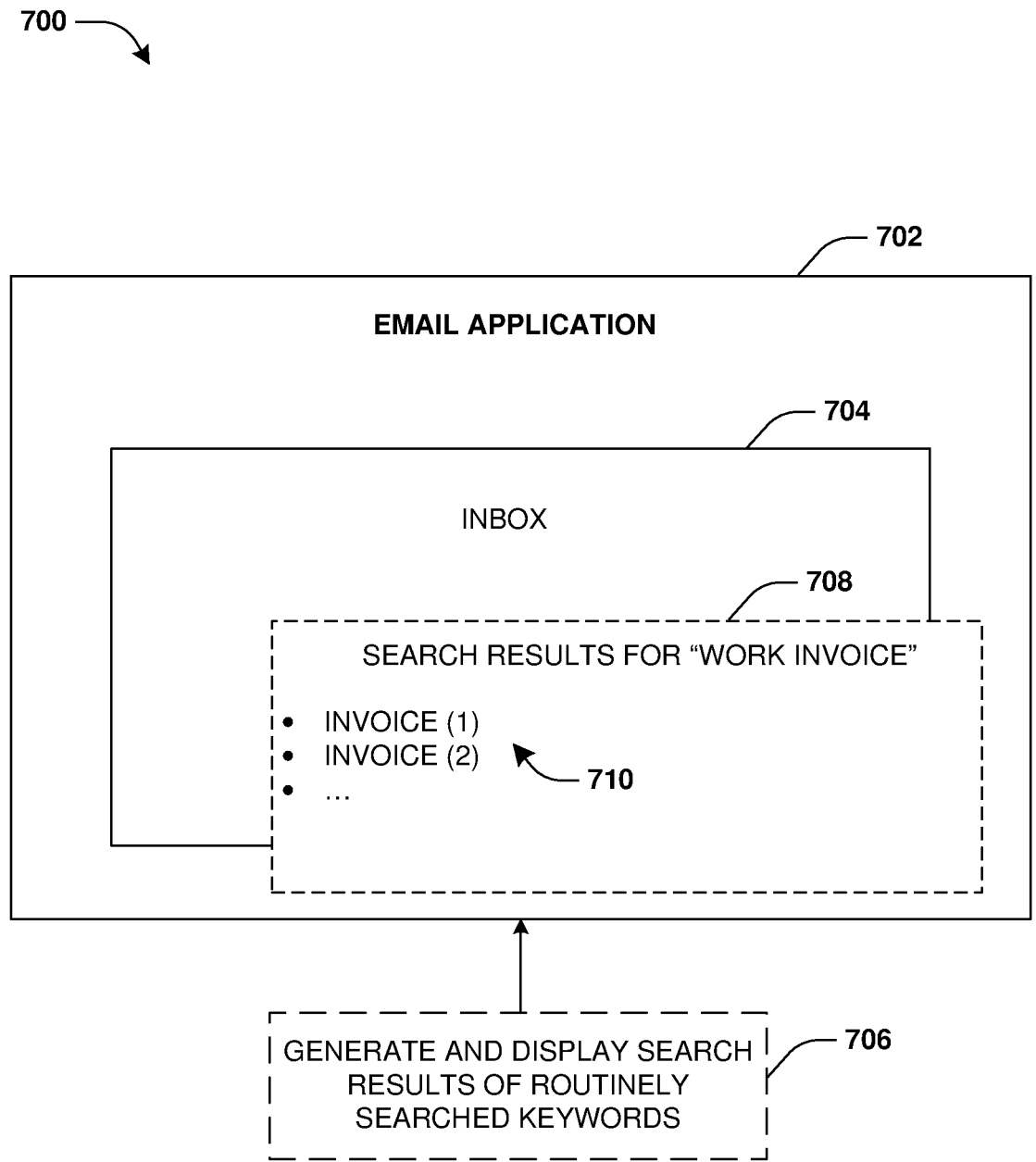
FIG. 7A is a component block diagram illustrating an example system for transforming operation of an application based upon real-time user activity analysis, where search results are displayed.
Figure 7B:
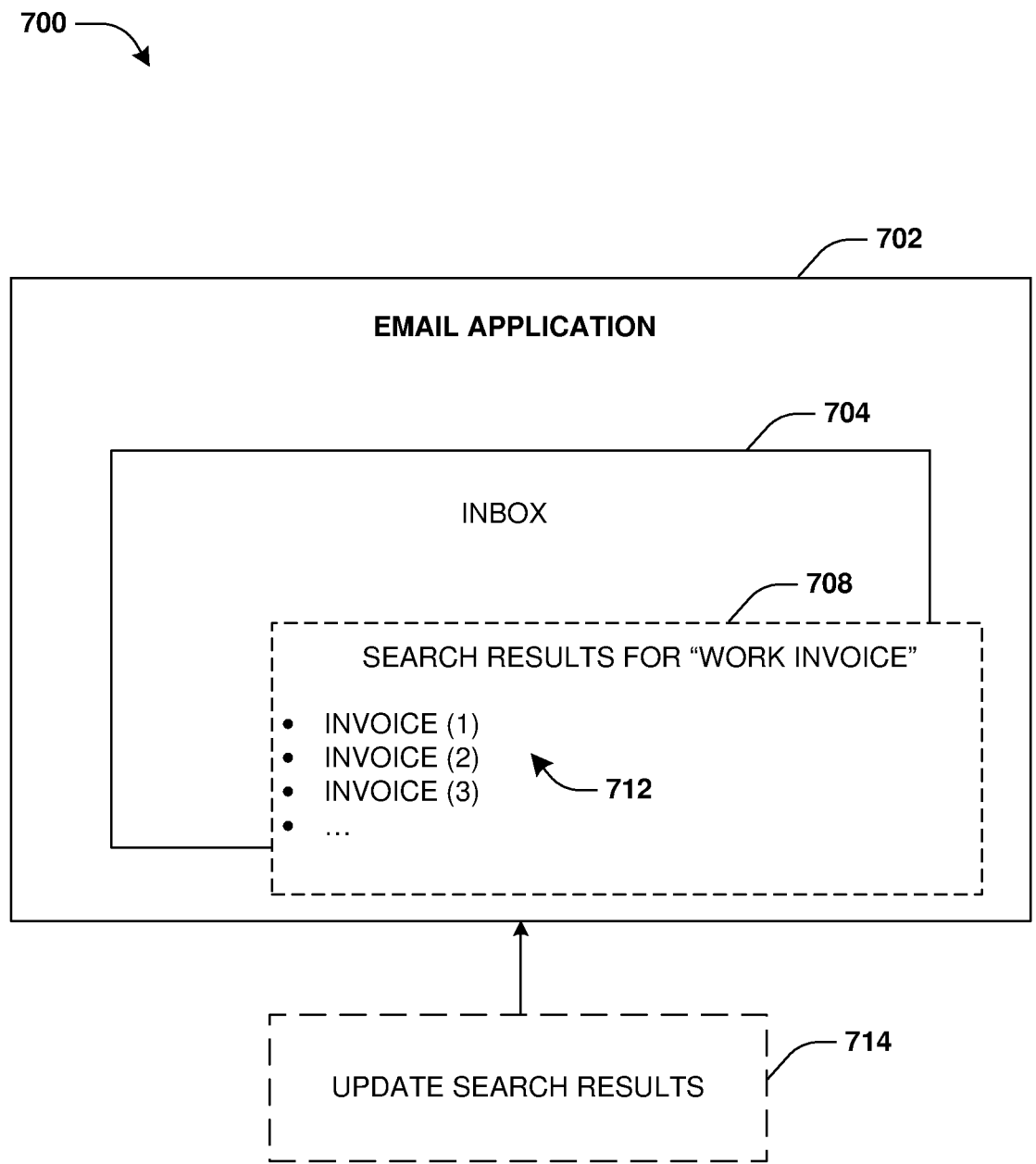
FIG. 7B is a component block diagram illustrating an example system for transforming operation of an application based upon real-time user activity analysis, where updated search results are displayed.

FIGS. 7A and 7B illustrate an example of a system 700 for transforming operation of an application based upon real-time user activity analysis. The user may routinely use an email application to search for work invoice emails within an inbox 704 (e.g., the user may receive a large volume of emails, but mainly focuses on reading and processing work invoice related emails). The user action of searching for emails matching keywords "work invoice" may be determined as occurring at a threshold frequency. For example, the threshold frequency may correspond to performing user actions more than 15 times within the last 5 hours. The context of the user action corresponds to searching emails, and data of the user action corresponds to obtaining search results matching the keywords "work invoice".

Operation of the email application 702 is transformed 706 based upon the user action occurring at the threshold frequency, as illustrated by FIG. 7A. For example, a search of the inbox 704 is automatically performed (e.g., when the user executes the email application 702, when the user navigates to the inbox 704, when the user clicks a search input button, etc.) using the keywords "work invoice" to obtain search results 710. The search results 710 are populated into a user interface 708 that is automatically displayed through the email application 702. As new search results 712 become available (e.g., new emails are received that match the keywords "work invoice"), the user interface 708 is dynamically updated 714 to display the new search results 712, as illustrated by FIG. 7B.

In an embodiment of transforming operation of an application based upon real-time user activity analysis, custom views are created based upon real-time user activity analysis. For example, a user may routinely search for certain keywords in an inbox of their email account. The present system can remember those keywords and provide a custom view that is dynamically updated in real-time the next time the user is looking at that view. When the present system identifies a user's most searched keywords, the present system can create a custom view for those frequently searched keywords and suggest them to the user. Custom views are updated in real-time, meaning, that if there are any new emails that match a keyword or if there is any action on emails containing the keyword, then the custom view is updated as well. If a user's habits change to less frequently using the view or searching for the keyword, then that custom view is replaced with a new custom view for another keyword of higher frequency.

Figure 8:
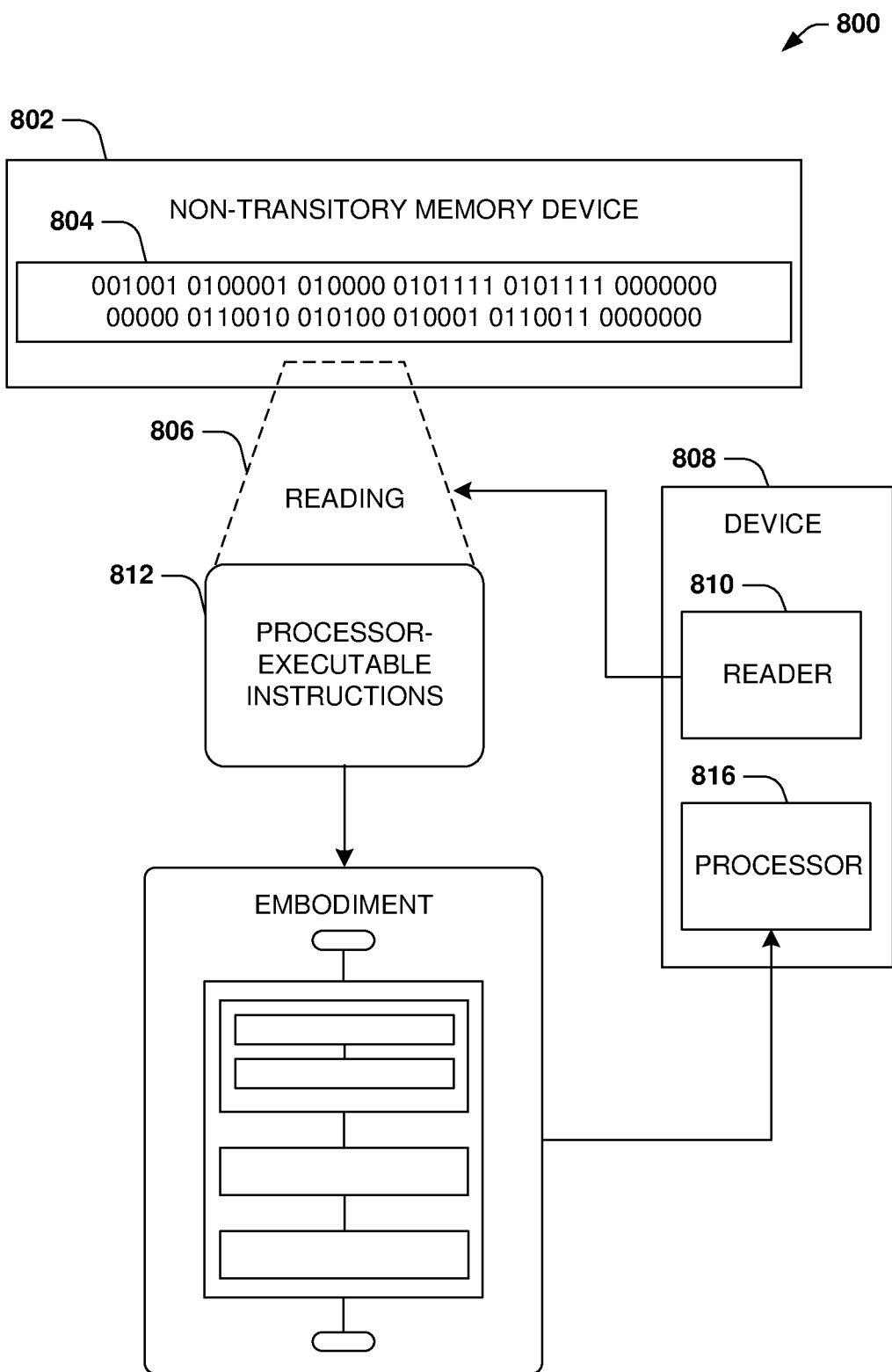
FIG. 8 is an illustration of a scenario featuring an example non-transitory machine readable medium in accordance with one or more of the provisions set forth herein.

FIG. 8 is an illustration of a scenario 800 involving an example non-transitory machine readable medium 802. The non-transitory machine readable medium 802 may comprise processor-executable instructions 812 that when executed by a processor 816 cause performance (e.g., by the processor 816) of at least some of the provisions herein. The non-transitory machine readable medium 802 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 802 stores computer-readable data 804 that, when subjected to reading 806 by a reader 810 of a device 808 (e.g., a read head of a hard disk drive, or a read operation invoked on a solid-state storage device), express the processor-executable instructions 812. In some embodiments, the processor-executable instructions 812, when executed cause performance of operations, such as at least some of the example method 400 of FIG. 4, for example. In some embodiments, the processor-executable instructions 812 are configured to cause implementation of a system, such as at least some of the example system 500 of FIG. 5, at least some of the example system 600 of FIG. 6, and/or at least some of the example system 700 of FIGS. 7A and 7B, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
executing, on a processor of a computing device, instructions that cause the computing device to perform operations, the operations comprising:
    detecting a user action performed on the computing device;
    determining, at a first time, a threshold frequency associated with the user action based upon a determination that the threshold frequency is defined for a type of the user action, wherein the type of the user action is a create meeting invite action, wherein the threshold frequency corresponds to a first number of occurrences of the type of the user action within a first time period;
    monitoring user interaction with an application executing on the computing device to determine that the user action was performed at the threshold frequency;
    evaluating the user action to identify a context of the application when the user action was performed;
    evaluating the user action to identify data upon which the user action was performed;
    in response to determining that a current context of the application matches the context, transforming operation of the application to include a data item corresponding to the data;
    detecting a second user action performed on the computing device;
    retrieving, at a second time after the first time, the threshold frequency based upon a determination that the second user action is of the type for which the threshold frequency is defined;
    monitoring user interaction with the application to determine whether the second user action was performed at the threshold frequency;
    detecting a third user action performed on the computing device, wherein a second threshold frequency, different than the threshold frequency, is defined for a second type of the third user action, wherein the second type of the third user action is a delete calendar entry action;
    monitoring user interaction with the application to determine that the third user action was performed at the second threshold frequency;
    evaluating the third user action to identify a second context of the application when the third user action was performed;
    evaluating the third user action to identify second data upon which the third user action was performed; and
    in response to determining that a second current context of the application matches the second context, transforming operation of the application based upon the second data.

2. The method of claim 1, wherein the transforming operation of the application to include the data item comprises:
    rendering a user interface populated with the data item for selection, wherein selection of the data item triggers the application to include the data item into content being accessed through the application.

3. The method of claim 2, comprising:
    identifying a set of data items corresponding to a set of data of the application upon which user actions were performed at the threshold frequency; and
    populating the user interface with the set of data items for selection.

4. The method of claim 1, wherein a third threshold frequency is defined for a third type of user action.

5. The method of claim 4, wherein the third threshold frequency corresponds to a third number of occurrences of a fourth user action of the third type of user action within a third time period.

6. The method of claim 4, comprising:
detecting a fourth user action, of the third type, performed on the computing device, wherein the fourth user action corresponds to a search for content accessible through the application;
evaluating the fourth user action to identify third data upon which the fourth user action was performed, wherein the third data corresponds to keywords used in the search;
performing a new search using the keywords to identify search results;
constructing a user interface populated with the search results; and
displaying the user interface through the application.

7. The method of claim 6, comprising:
monitoring content of the application to identify updated search results corresponding to the keywords; and
dynamically updating the user interface as new updated search results are identified.

8. The method of claim 4, comprising:
detecting a fourth user action, of the third type, performed on the computing device; and
monitoring user interaction with the application to determine that the fourth user action was performed at the third threshold frequency.

9. The method of claim 8, wherein the third type of user action is a search action.

10. The method of claim 8, wherein the third type of user action is a create social network post action.

11. A computing device comprising:
a processor; and
memory comprising processor-executable instructions that when executed by the processor cause performance of operations, the operations comprising:
monitoring user interaction with an application executing on the computing device to determine that a user action was performed at a threshold frequency defined for a type of the user action, wherein the type of the user action is a create meeting invite action;
evaluating the user action to identify a context of the application when the user action was performed;
evaluating the user action to identify data upon which the user action was performed;
in response to determining that a current context of the application matches the context, transforming operation of the application to include a data item corresponding to the data;
monitoring user interaction with the application executing on the computing device to determine that a second user action was performed at the threshold frequency based upon a determination that the second user action is of the type for which the threshold frequency is defined;
detecting a third user action performed on the computing device, wherein a second threshold frequency, different than the threshold frequency, is defined for a second type of the third user action, wherein the second type of the third user action is a delete calendar entry action;
monitoring user interaction with the application to determine that the third user action was performed at the second threshold frequency;
evaluating the third user action to identify a second context of the application when the third user action was performed;
evaluating the third user action to identify second data upon which the third user action was performed; and
in response to determining that a second current context of the application matches the second context, transforming operation of the application based upon the second data.

12. The computing device of claim 11, wherein the operations comprise:
monitoring user interactions with the application to identify a set of user actions performed through the application;
determining categories of user actions within the set of user actions;
maintaining a data structure mapping the categories with counts of how frequently user actions of each category are performed; and
evaluating the data structure to determine that a count of the user action being performed exceeds the threshold frequency.

13. The computing device of claim 12, wherein the operations comprise:
updating the data structure based upon identifying new user actions being performed.

14. The computing device of claim 11, wherein the operations comprise:
evaluating content within the application to determine that a user of the application will be traveling at a point in time; and
displaying a recommendation to set an out of office auto reply feature or send an out of office email to email addresses of users within a contact list of the application,
wherein at least one of:
the operations comprise:
retrieving the data item from a remote service that provides content to the application over a network; and
caching the data item into a cache of the computing device for local access by the application to the data item; or
the operations comprise:
identifying a fourth user action that has a probability above a threshold of being performed subsequent the user action; and
in response to identifying performance of the user action, executing the fourth user action.

15. A non-transitory machine readable medium having stored thereon processor-executable instructions that when executed cause performance of operations, the operations comprising:
detecting a user action;
determining a threshold frequency associated with the user action based upon a determination that the threshold frequency is defined for a type of the user action, wherein the type of the user action is a create meeting invite action;
monitoring user interaction with an application executing on a computing device to determine that the user action was performed at the threshold frequency;
evaluating the user action to identify a context of the application when the user action was performed;

evaluating the user action to identify data upon which the user action was performed;

in response to determining that a current context of the application matches the context, transforming operation of the application to include a data item corresponding to the data;

detecting a second user action;

determining a second threshold frequency associated with the second user action based upon a determination that the second threshold frequency is defined for a second type of the second user action, wherein the second type of the second user action is a delete calendar entry action;

monitoring user interaction with the application to determine whether the second user action was performed at the second threshold frequency;

detecting a third user action of the second type;

monitoring user interaction with the application to determine that the third user action was performed at the second threshold frequency;

evaluating the third user action to identify a second context of the application when the third user action was performed;

evaluating the third user action to identify second data upon which the third user action was performed; and in response to determining that a second current context of the application matches the second context, transforming operation of the application based upon the second data.

16. The non-transitory machine readable medium of claim 15, wherein the operations comprise:
   retrieving the data item from a remote service that provides content to the application over a network; and
   caching the data item into a cache of the computing device for local access by the application to the data item.

17. The non-transitory machine readable medium of claim 15, wherein the operations comprise:
   identifying a fourth user action that has a probability above a threshold of being performed subsequent the user action; and
   in response to identifying performance of the user action, executing the fourth user action.

18. The non-transitory machine readable medium of claim 15, wherein the operations comprise:
   dynamically identifying a set of user actions that are performed at the threshold frequency; and
   providing a recommendation of the set of user actions through the application.

19. The non-transitory machine readable medium of claim 15, wherein the data item comprises at least one of an image or a video, and wherein the operations comprise:
   inserting at least one of the image or the video into content of the application.

20. The non-transitory machine readable medium of claim 19, wherein the inserting comprises:
   inserting at least one of the image or the video into a calendar entry, a document or a message being at least one of accessed or composed through the application.

* * * * *